United States Patent Office 3,433,747
Patented Mar. 18, 1969

3,433,747
METHOD OF PREPARING PETROLEUM
CRACKING CATALYSTS
John S. Magee, Jr., Baltimore, and Warren S. Briggs, Silver Spring, Md., assignors to W. R. Grace & Co., New York, N.Y., a corporation of Connecticut
No Drawing. Filed Nov. 4, 1966, Ser. No. 591,968
U.S. Cl. 252—433      6 Claims
Int. Cl. B01j 11/64

ABSTRACT OF THE DISCLOSURE

A means for preparing silica and alumina cracking catalysts which comprises gelling an appropriate sol with gaseous $BF_3$, followed by washing and drying the gel.

---

This invention relates to cracking catalysts and more particularly to a novel process for preparing silica, alumina or silica-alumina composites which are suitable for use in petroleum cracking processes.

In the catalytic cracking of hydrocarbons, oil stock is vaporized and heated to a temperature of about 800 to 1000° F. at greater than atmospheric pressure. The hydrocarbon vapors are intimately contacted with a cracking catalyst where the high boiling constituents are converted into gasoline. Several complex side reactions take place simultaneously with the cracking reaction such as polymerization, alkylation and the like. As a result of these reactions, a carbonaceous deposit referred to in the art is coke formed on the surface of the catalyst. This deposit severely impairs the cracking efficiency of the catalyst. Catalytic activity is restored by burning the deposit from the catalyst surface in a stream of oxidizing gas and the catalyst is returned to the cracking process. Such regeneration is usually carried out at temperatures above the cracking temperature. Catalyst regeneration is exothermic and excessive heat is developed during this stage of the process.

The most commonly used cracking catalysts are the composites of silica-alumina and silica-alumina-magnesia. These composites may be promoted with varying amounts of zeolitic type materials known as molecular sieves.

The cracking activity of the catalyst is dependent on the number, strength, and availability of acid sites. A catalyst with a large number of available strong acid sites is the most active type of catalyst for petroleum cracking.

It is also known that short life and decreasing catalytic activity are related to loss and strength of the catalyst. This loss is believed to be due to loss of heat stability of the catalyst and occurs during the process and in the regeneration stage. It is important, therefore, that the catalyst be relatively heat stable. This property is particularly desirable in fluid cracking catalytic systems which employ finely divided solid catalysts. In a fluid process, a high degree of turbulence is necessary throughout the system to insure uniform suspension of the catalyst and the reacting vapors. Consequently the catalyst undergoes physical deterioration and appreciable quantities of fines are produced. These fines are difficult to retain within the system and represent a loss which often cannot be tolerated. It is, therefore, critically important that the catalyst have suitable attrition resistant properties.

The present invention provides an improved process for preparing silica catalyst, alumina catalyst, silica-alumina catalyst and other mixed composite catalysts. Sulfuric acid is the gelling agent used in several of the conventional processes for preparing silica-alumina cracking catalysts. U.S. Patent 2,886,512 discloses substitution of carbon dioxide for mineral acid to neutralize the silicate and form a slurry of silica hydrogel particles suspended in alkali metal carbonate.

We have found that a very desirable catalyst can be prepared by using boron trifluoride as the gelling agent. This system has several advantages. In the first place, it increases the number of acid sites available for cracking and adds fluorine, which has been found to be a very desirable catalyst component to the system.

Our process will be described in the preparation of a conventional silica-alumina cracking catalyst. The first step of the process comprises preparation of a sodium silicate solution. The silicate solution is normally prepared to have a silica to sodium oxide ratio of 3 to under 3.4 to 1. This silicate solution is gelled by addition of boron trifluoride. A suitable catalyst can be prepared by this process alone. The product sets to a firm gel which is dried overnight, washed with ammonium sulfate solution and filtered. After washing is complete, the catalyst is dried and found to have desirable cracking properties. A catalyst of this type would contain $B_2O_3$, fluorine, silica as the principal component and less than 3 percent $Na_2O$.

The next step of the process provides 75 to 95 percent of the active alumina content of a silica-alumina catalyst. This is done by mixing a solution of a soluble aluminum sol with the silicate gel. For purposes of simplicity and because of cost considerations, aluminum sulfate (alum) is the preferred compound for use in supplying the alumina content. In the last step of the conventional process, silica-alumina composite is spray dried followed by conventional washing, drying and redrying steps.

In an alternative process, the silica hydrogel prepared by the addition of boron trifluoride to a sodium silicate solution is dried and washed. The other ions such as aluminum or magnesium may be added to the hydrogel. In this case, ammonia is added to increase the pH to about 10.0. The product is then washed with ammonium sulfate and/or ammonium carbonate, dried and the catalyst product recovered. The activity of a catalyst prepared in this manner is substantially higher than the activity of a catalyst containing silica alone.

In still another technique, the catalyst is prepared to contain no silica. In this system, a sodium aluminate solution is gelled by the addition of boron trifluoride. This gel is treated in a manner very similar to the gel prepared from silicate. The gel is broken, dried and washed to remove the sodium impurities. The gel is dried and is then a suitable cracking catalyst. A catalyst of this type contains alumina as a principal constituent; about 2 to 3 percent boron and up to about 6 percent fluorine. As in the silica system, the catalyst can be converted to a magnesia-alumina-boron-fluoride catalyst by the addition of a source of magnesia such as magnesia sulfate, for example.

The essential feature of our novel process is the use of boron trifluoride ($BF_3$) as a gelling agent. The $BF_3$ is conveniently added to the silicate or aluminate solution as a gas. The $BF_3$ is passed into the reaction mixture at a rate of 0.5 to 1.5 liters per minute. The source of silica is sodium silicate and the source of alumina is sodium aluminate in each of the processes. The sodium silicate solution has a $Na_2O/SiO_2$ ratio about 3 to 1 to 3.4 to 1. When the aluminate is used, the $Na_2O/Al_2O_3$ ratio is 1 to 1 to 1.5 to 1.

The next step of each of these processes is the washing step. The catalyst composites are washed to remove sodium because of the well known deleterious properties of sodium. The washing may be carried on with any suitable reagent. The most convenient reagents for this washing are the soluble ammonium salts, the sulfate and carbonate being especially preferred. The wash solutions are preferably maintained at low concentrations. Concentrations of about 2 to 10 percent give satisfactory results. The preferred concentration is about 3 to 5 percent. After the product is washed, it is again dried to prepare a catalyst having suitable properties. Drying is carried out at temperature of about 30 to 600° F., preferably about 400° F. for about 1 to 6 hours, preferably about 2 to 4 hours.

The method is further illustrated by the following specific but non-limiting examples.

EXAMPLE I

A total of 1500 ml. of a commercially available sodium silicate was diluted to a silica concentration of 5.5 percent, gaseous $BF_3$ was added slowly until the silicate formed a gel (in about 3 minutes). The gel was broken into small pieces and dried at 400° F. for a period of about 16 hours. The dried gel was washed with 2 500-ml. washes of 4 percent ammonium sulfate solution heated to 140° F. by slurrying the gel with the ammonium sulfate solution, the gel was filtered after each wash and then washed with 2 500-ml. washes of 5 percent ammonium carbonate solution and rinsed with 1 500-ml. wash of deionized water. After the final wash, the filter residue was dried at 400° F. for a period of 3 hours. The product was analyzed, the analysis was as follows:

| | Percent |
|---|---|
| $SiO_2$ | 93.6 |
| $B_2O_3$ | 4 |
| $Na_2O$ | 2.1 |
| Fluorine | 0.32 |

The conversion and selectivity of each of these catalysts was determined using micro activity test equipment. The equipment consists of a tubular glass reactor surrounded by a furnace. The apparatus is equipped with a motor driven gear train which drives a 1 cc. gas oil feed syringe which extends through a serum cap into the glass reactor. The reactor contains 5 grams of the catalyst under test, pilled to 3/32 by 3/32 inch pills. The reactor is held at 900° F. in the furnace block. Oil is fed to the reactor for 4.7 minutes followed by 15 minutes of nitrogen stripping. The product drops into a calibrated micro receiver from which the uncondensible gases are removed during the reaction stripping cycle. The total off-gas goes to a chromatograph which uses argon as a carrier. Its hydrogen content is determined chromatographically. A portion of the product, 0.1 cc., which has been uniformly mixed with the stripping nitrogen is then charged with helium pressure through a calibrated 3-way stop cock to a high temperature chromatograph, the 400° F. cut point is determined by chromatography enabling calculation of the conversion. The coke formed in the reaction is determined by conventional analysis, after the catalyst is removed from the unit. Hydrogen and coke are determined relative to the yields obtained with a standard 0.88 cc. per gram pore volume high alumina catalyst. In this series of runs, the charge stock is fed at the rate of 0.21 ml. per minute at a catalyst to oil ratio of 5.8 using weight hourly space velocity of 2.15. The activity index is determined from the percentage of the oil converted to a product having a boiling point of about 400° F. The silica-boron-fluoride catalyst of this example had a gas oil conversion of 10.2 percent with 5.5 percent conversion to a $C+_4$ gasoline fraction.

EXAMPLE II

This example illustrates the preparation of a silica-magnesia catalyst. The first portion of the preparation was exactly the same as in Example I. The hydrogel was prepared, broken and magnesia was added by stirring the gel with a solution containing about 39 grams of magnesia prepared by dissolving 246 grams of magnesium sulfate .7H_2O in 600 ml. of water. After this addition, 50 ml. of 28 percent ammonium hydroxide was added to adjust the pH of the product to 10.0. The product was washed with 2 500-ml. washes of 4 percent ammonium sulfate solution heated to 140° F. and 2 500-ml. washes of 5 percent ammonium carbonate. The product is finally washed with 1 500-ml. wash of deionized water, and dried at 400° F. for 3 hours. The analysis of the catalyst was as follows:

| | Percent |
|---|---|
| $SiO_2$ | 71 |
| MgO | 22.8 |
| $B_2O_3$ | 2.6 |
| F | 0.5 |
| $Na_2O$ | 0.8 |
| $SO_4$ | 2.6 |

The cracking activity was determined using the process described above. The catalyst had a gas oil conversion of 61 percent with 57 percent conversion to $C_4+$ gasoline and 48 percent conversion to $C_5+$ gasoline.

EXAMPLE III

This example illustrates the preparation of an alumina-boron-fluoride catalyst.

A sodium aluminate solution was prepared by dissolving 252.8 grams of $Na_2O.Al_2O_3.3H_2O$ in enough water to prepare 2 liters of solution. The solution is heated to 100° F. and $BF_3$ was bubbled into the solution at a rate of 1000 cc. per minute for about 25 minutes. The solution turned milky white and the temperature increased to 130° F. over this period. The filtrate had a pH of approximately 11. The product was filtered and dried at 230° F. overnight. Conversion was 5.9 percent at 16 weight hourly space velocity and 900° F.

EXAMPLE IV

This example illustrates the preparation of a silica-alumina boron fluoride catalyst.

A sodium aluminate solution was prepared by dissolving 63.2 grams of $Na_2O.Al_2O_3.H_2O$ in enough water to prepare a solution having a total volume of 500 ml. $BF_3$ was bubbled into 1580 ml. of silicate solution at the rate of approximately 100 ml. per minute for a period of 30 minutes. Gelation occurred at 4½ minutes after the start of $BF_3$ addition. At the end of this time, the aluminate solution was added to the 1580 ml. of a sodium silicate solution (5.5% $SiO_2$) and $BF_3$ additional continued. $BF_3$ gas was bubbled into this mixture for an additional 1 minute. The final solution temperature was 108° F. The product was filtered; the filtrate had a pH of 7. The filter cake was dried overnight at 230° F.

Both the catalyst of Example III and IV were ground through a micro pulverizer and washed with 4 500-ml. washes of 3 percent ammonium sulfate solution heated to 100° F. by slurrying the filter cake with wash solution and withdrawing the filtrate into a filter flask. The catalyst was rinsed with 1 500-ml. wash with water at a temperature of 140° F., and dried at 230° F. overnight. Conversion was 49.4 percent at 16 weight hourly space velocity and 900° F.

EXAMPLE V

This example shows the preparation of silica-alumina magnesia-boron-fluoride catalyst.

A sodium silicate solution was prepared by diluting 1500 ml. of commercially available sodium silicate to a $SiO_2$ concentration of 5.5 percent. The $BF_3$ was bubbled into the solution at a rate of about 4 liters per minute for a period of 3 minutes. A 143 ml. portion of 0.58 molar sodium aluminate solution was added to the silicate 3 seconds after the start of the addition of $BF_3$. The product was filtered and magnesia added by adding magnesium sulfate solution prepared by dissolving 246 grams of magnesium sulfate in 600 ml. of water. The magnesium sulfate solution was mixed with the silica-alumina composite and the composite filtered. The catalyst was dried for about 24 hours at 400° F. and passed through a micro pulverizer. The catalyst was washed with 4 500-ml. washes in 3 percent ammonium sulfate solution by slurrying the solution with the product in a filter and was rinsed with 1 500-ml. water rinse. Both the washes and the rinse were heated to 140° F. Conversion was 66.8 at 16 weight hourly spaced velocity and 900° F.

Obviously many modifications and variations of the invention may be made without departing from the essence and scope thereof and only such limitations should be applied as are indicated in the appended claims.

What is claimed is:

1. A process for preparing petroleum cracking catalysts containing boron which comprises the steps of:
   (a) preparing solution of sodium silicate or sodium aluminate to provide the major component,
   (b) gelling the solution with boron trifluoride gas,
   (c) adding from 0 to 50 percent of another component, selected from the group consisting of silica, alumina, boria, and magnesia,
   (d) washing, drying and recovering the catalyst product.

2. The process according to claim 1 wherein the major component is provided by a sodium silicate solution having a silica concentration of about 5 percent, the boron trifluoride is added at a rate of 10 to 1000 ml. per minute until gelation occurs, and the composite is washed with an ammonium salt solution to remove the sodium.

3. The process according to claim 2 wherein the ammonium salt solution is ammonium sulfate or ammonium carbonate in a concentration of about 2 to 5 percent by weight.

4. The process according to claim 1 wherein the major component is provided by a sodium aluminate solution containing 1 to 10 percent alumina, the aluminate is gelled by the addition of boron trifluoride, added at a rate of 10 to 1000 ml. per minute until gelation occurs, the catalyst is washed with an ammonium salt solution to remove sodium impurities, and the product is dried at a temperture of about 300 to 500° F.

5. The process according to claim 4 wherein the ammonium salt solution is ammonium sulfate or ammonium carbonate in a concentration of about 2 to 5 percent by weight.

6. The process according to claim 1 wherein the major component is provided by a sodium silicate solution, having a silica concentration of about 5 percent, the boron trifluoride is added at a rate of about 10 to 1000 ml. per minute, the minor constituent is alumina added as an alum solution to the gelled silicate in an amount sufficient to provide 10 to 30 percent alumina in the final product, and the composite is washed with ammonium sulfate solution in a concentration of about 2 to 5 percent.

No references cited.

DANIEL E. WYMAN, *Primary Examiner.*

P. M. FRENCH, *Assistant Examiner.*

U.S. Cl. X.R.

252—463